United States Patent
Tokashiki et al.

(10) Patent No.: US 8,384,828 B2
(45) Date of Patent: Feb. 26, 2013

(54) VIDEO DISPLAY DEVICE, VIDEO DISPLAY METHOD AND SYSTEM

(75) Inventors: Mamoru Tokashiki, Tokyo (JP); Jun Hirai, Tokyo (JP); Hideo Nagasaka, Kanagawa (JP); Naoya Okamoto, Tokyo (JP)

(73) Assignee: Sony Corporation (JP)

( * ) Notice: Subject to any disclaimer, the term of this patent is extended or adjusted under 35 U.S.C. 154(b) by 441 days.

(21) Appl. No.: 12/583,848

(22) Filed: Aug. 27, 2009

(65) Prior Publication Data

US 2010/0053441 A1 Mar. 4, 2010

(30) Foreign Application Priority Data

Sep. 4, 2008 (JP) ................................ 2008-226697

(51) Int. Cl.
*H04N 5/445* (2011.01)
*H04N 5/14* (2006.01)
*G09G 5/02* (2006.01)

(52) U.S. Cl. ......... 348/576; 348/564; 348/571; 345/589

(58) Field of Classification Search .................. 348/576, 348/577, 553, 564, 552, 722, 571; 345/581–605
See application file for complete search history.

(56) References Cited

U.S. PATENT DOCUMENTS

| | | | | |
|---|---|---|---|---|
| 6,337,692 B1 * | 1/2002 | Rai et al. | ........................ | 345/594 |
| 6,530,083 B1 * | 3/2003 | Liebenow | ........................ | 725/46 |
| 8,094,162 B2 * | 1/2012 | Jung | ............................. | 345/581 |
| 2008/0143734 A1 | 6/2008 | Ishii et al. | | |

FOREIGN PATENT DOCUMENTS

| | | |
|---|---|---|
| JP | 06035659 A | 2/1994 |
| JP | 2004080549 A | 3/2004 |
| JP | 2004186927 A | 7/2004 |
| JP | 2005229352 A | 8/2005 |
| JP | 2006314014 A | 11/2006 |
| JP | 2007139855 A | 6/2007 |
| JP | 2008-028871 A | 2/2008 |

OTHER PUBLICATIONS

Office Action from Japanese Application No. 2008-226697, dated May 25, 2010.

* cited by examiner

*Primary Examiner* — Michael Lee
(74) *Attorney, Agent, or Firm* — Lerner, David, Littenberg, Krumholz & Mentlik, LLP

(57) ABSTRACT

There is provided a video display device including a content control unit for displaying a video content on a display screen; a user specifying unit for specifying a user viewing a video content displayed on the display screen; and an image quality adjustment unit for adjusting the image quality of the display screen according to the user specified by the user specifying unit.

6 Claims, 11 Drawing Sheets

VIDEO DISPLAY DEVICE, VIDEO DISPLAY METHOD AND SYSTEM

CROSS-REFERENCE TO RELATED APPLICATION

The present application claims priority from Japanese Patent Application No. JP 2008-226697 filed in the Japanese Patent Office on Sep. 4, 2008, the entire content of which is incorporated herein by reference.

BACKGROUND OF THE INVENTION

1. Field of the Invention

The present invention relates to a video display device, a video display method, and a system.

2. Description of the Related Art

In recent years, higher image quality and greater functions are being achieved in the video display device such as television. The image quality of the video display device is determined by various parameters. Such parameters are often preset at the shipping stage of the video display device.

However, the adjusted and preset parameters are few compared to the entire parameter, and may not be set to realize the image desired by the user. Various types and programs are assumed for the video content displayed by the video display device, and the present parameter may not be suited to each video content.

The video display device is configured such that various parameters for determining the image quality can be adjusted, where each user can create the preferred image by changing the parameters.

Such setting of the image quality is often carried out by a manual setting panel etc. of the video display device. Therefore, the user uses the setting panel to adjust and set various parameters while looking at the transitioning screens.

SUMMARY OF THE INVENTION

However, the setting method is difficult to understand and the setting of various parameters is not easy for the user who is unfamiliar with the operation of electronic devices such as the video display device. The user thus often uses the default setting even if the image quality is not as desired.

Japanese Patent Application Laid-Open No. 2008-28871 discloses a video display device for acquiring the set value of the parameter recorded in the server according to the content of the video content, and automatically setting the parameter. The video display device described in Japanese Patent Application Laid-Open No. 2008-28871 can automatically adjust the parameter according to each content, and thus even the user who is unfamiliar with the operation of the electronic device can enjoy the image quality better than the default setting to a certain extent.

However, the preference of the individual user with respect to the image quality often differs such as preferring bright image, preferring dark image, or preferring image quality in which red is strong. Therefore, in the video display device described in Japanese Patent Application Laid-Open No. 2008-28871, the preference of the individual user is difficult to reflect. Furthermore, in the video display device described in Japanese Patent Application Laid-Open No. 2008-28871, the preference of the individual user is difficult to reflect even if better image quality corresponding to the video content can be set than when adjustment is made by the setting panel such as adjusting the setting according to the individual user.

The present invention addresses the above-identified, and other issues associated with conventional methods and apparatuses, and it is desirable to provide a new and improved video display device, a video display method, and a system capable of reflecting the preference of the individual user and setting a more satisfactory image quality.

According to an embodiment of the present invention, there is provided a video display device including: a content control unit for displaying a video content on a display screen; a user specifying unit for specifying a user viewing the video content displayed on the display screen; and an image quality adjustment unit for adjusting the image quality of the display screen according to the user specified by the user specifying unit.

According to such configuration, the video content is displayed on the display screen by the content control unit. The user viewing the relevant video content is specified by the user specifying unit. The image quality of the display screen is adjusted according to the specified user by the image quality adjustment unit. Therefore, the video display device can adjust the image quality according to the user who is actually viewing.

The video display device may further include a preference information generation unit for generating preference information with respect to an image quality of the user specified by the user specifying unit, wherein the image quality adjustment unit may adjust the image quality of the display screen based at least on the preference information generated by the preference information generation unit.

The preference information generation unit may cause the content control unit to display a plurality of videos adjusted to a different image quality by the image quality adjustment unit on the display screen and select at least one of the plurality of videos according to the operation of the user, and generates the preference information based on the selection result.

The video display device may further include an environmental setting unit for setting environmental information representing an environment in which the user is viewing the display image, wherein the image quality adjustment unit may adjust the image quality of the display screen based further on the environmental information set by the environmental setting unit.

The video display device may further include a content acquiring unit for acquiring the video content and attribute information representing an attribute of the video content, wherein the image quality adjustment unit may adjust the image quality of the display screen based further on the attribute information acquired by the content acquiring unit.

The video display device may further include an image quality information acquiring unit for acquiring image quality information from a server recorded with the image quality information representing a setting state of the image quality of the display screen, wherein the image quality adjustment unit may adjust the image quality of the display screen based further on the image quality information acquired by the image quality information acquiring unit.

The video display device may further include: the content acquiring unit for acquiring the video content and the attribute information representing the attribute of the video content; and an image quality information acquiring unit for acquiring image quality information from a server recorded with the image quality information representing a setting state of the image quality of the display screen and being associated with the attribute information of the video content, wherein the image quality adjustment unit may adjust the image quality of the display screen based on the image quality information associated with the attribute information acquired by the content acquiring unit.

The image quality information acquiring unit may acquire from the server the image quality information changed according to an evaluation of a viewer of the video content in the server.

According to another embodiment of the present invention, there is provided a video display method including the steps of: displaying a video content on a display screen; specifying a user viewing the video content displayed on the display screen; and adjusting an image quality of the display screen for every user specified in the user specifying step.

According to another embodiment of the present invention, there is provided a system including: a video display device for displaying a video content on a display screen; and a server recorded with image quality information representing a setting state of the image quality of the display screen, wherein the video display device includes, a user specifying unit for specifying a user viewing the video content displayed on the display screen, an image quality information acquiring unit for acquiring the image quality information from the server, and an image quality adjustment unit for adjusting the image quality of the display screen for every user specified by the user specifying unit based on the image quality information acquired by the image quality information acquiring unit.

As described above, according to the present invention, a more satisfactory image quality can be set while reflecting the preference of each user.

DETAILED DESCRIPTION OF THE PREFERRED EMBODIMENTS

Figure 1:
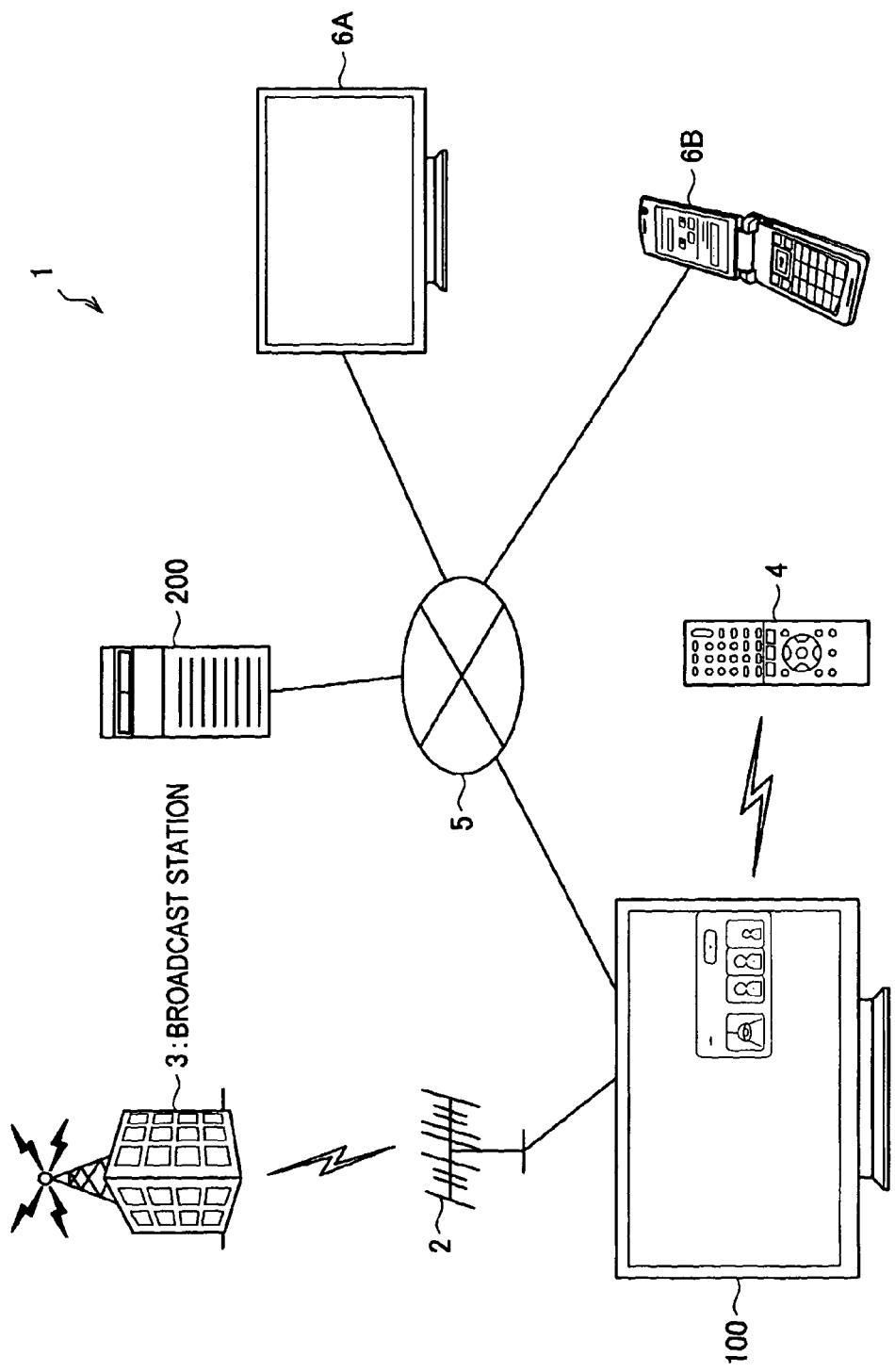
FIG. 1 is an explanatory view for describing an outline of a system according to one embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

<Outline of One Embodiment>

First, the outline of a system according to one embodiment of the present invention will be described with reference to FIG. 1. FIG. 1 is an explanatory view for describing the outline of the system according to the present embodiment.

As shown in FIG. 1, a system 1 according to the present invention broadly includes a video display device 100 and a server 200.

The video display device 100 receives the "video content" broadcasted in and transmitted from a broadcast station 3 with a reception device (e.g., antenna 2), and displays the video content on a display unit 110. The video content represents video of a program or a video of a commercial broadcasted from the broadcast station 3, and includes still images in addition to moving images, and also includes audio. For the sake of convenience of the explanation, the video content displayed by the video display device 100 will be described as a broadcast wave. However, the video display device 100 according to the present embodiment can wire broadcasted display video contents, video contents recorded in a predetermined recording medium and reproduced in a reproduction device, and video contents reproduced with a video game machine and an information processing device. The term "video" referred to herein refers to the image displayed by the video display device 100 and includes both the moving images and the still images.

The video content transmitted from the broadcast station 3 also contains "attribute information". The attribute information is information representing the attribute of the video content. The attribute of the video content includes, for example, ID (Identification) of the video content, type (genre), outline of content etc., information regarding performers and producers, broadcasting time zone and broadcasting channel, target viewer of the video content, information provided to the viewer in association with the video content, and the like. Such attribute information may be EPS (Electronic Program guide), and the like.

The video display device 100 may be Cathode Ray Tube (CRT), Liquid Crystal Display (LCD), Plasma Display Panel (PDP), Field Emission Display (FED), Organic Electro Luminescence Display (organic EL, OELD: Organic Electroluminescence Display), video projector, and the like.

The video display device 100 operates according to a predetermined signal sent from a button etc. arranged on a predetermined operation panel or a remote controller 4 arranged with the operation button etc. A case in which the remote controller 4 wirelessly transmits (e.g., infrared light) a predetermined operation signal according to the operation of the user, and the video display device 100 acquires such operation signal and performs a predetermined operation will be described.

The video display device 100 displays a manual adjustment setting panel (e.g., slider bar or numerical value changing screen) on the display unit 110, so that the image quality can be changed. The image quality is determined by various parameters. The parameters include picture, brightness, contrast, sharpness, coloring, RGB gain, RGB bias etc., but are not limited thereto, and various parameters can be used. The information defined with the set value of each parameter is hereinafter also referred to as "image quality information". That is, the image quality information is the information representing the setting state of the image quality of the display screen. When manually adjusting each parameter, the parameter of the image quality actually displayed is set based on the setting panel displayed on the display unit 110 by the video display device 100, and the operation signal output by the remote controller 4 etc. according to the operation of the user referencing the setting panel (manual mode). The image quality information used in the actual display can be changed as a result. Other than manually adjusting each parameter, the video display device 100 according to the present embodiment can change each parameter according to each user, which will be specifically described below.

The video display device 100 is communicable with the server 200 through a network 5 such as Internet and LAN (Local Area Network). The server 200 records plural image quality information defined with the set value of each parameter, as hereinafter described. Therefore, the video display device 100 acquires the image quality information from the server 200, and uses the same to adjust the image quality of the video display device 100 itself. The server 200 is connected with other video display devices 6A, and terminals 6B such as portable telephone, PDA (Personal Digital Assistant), and computer through the network 5. The other video display device 6A can acquire the image quality information from the server 200 and use the same. The video display device 100, the other video display device 6A, and the terminal 6B can rewrite the image quality information recorded in the server 200 or newly record the image quality information in the server 200 by accessing the server 200.

<Each Configuration of One Embodiment>

The outline of the system according to one embodiment of the present invention has been described above.

Each configuration will be described in more detail with reference to FIGS. 2 to 6.

(Video Display Device 100)

Figure 2:
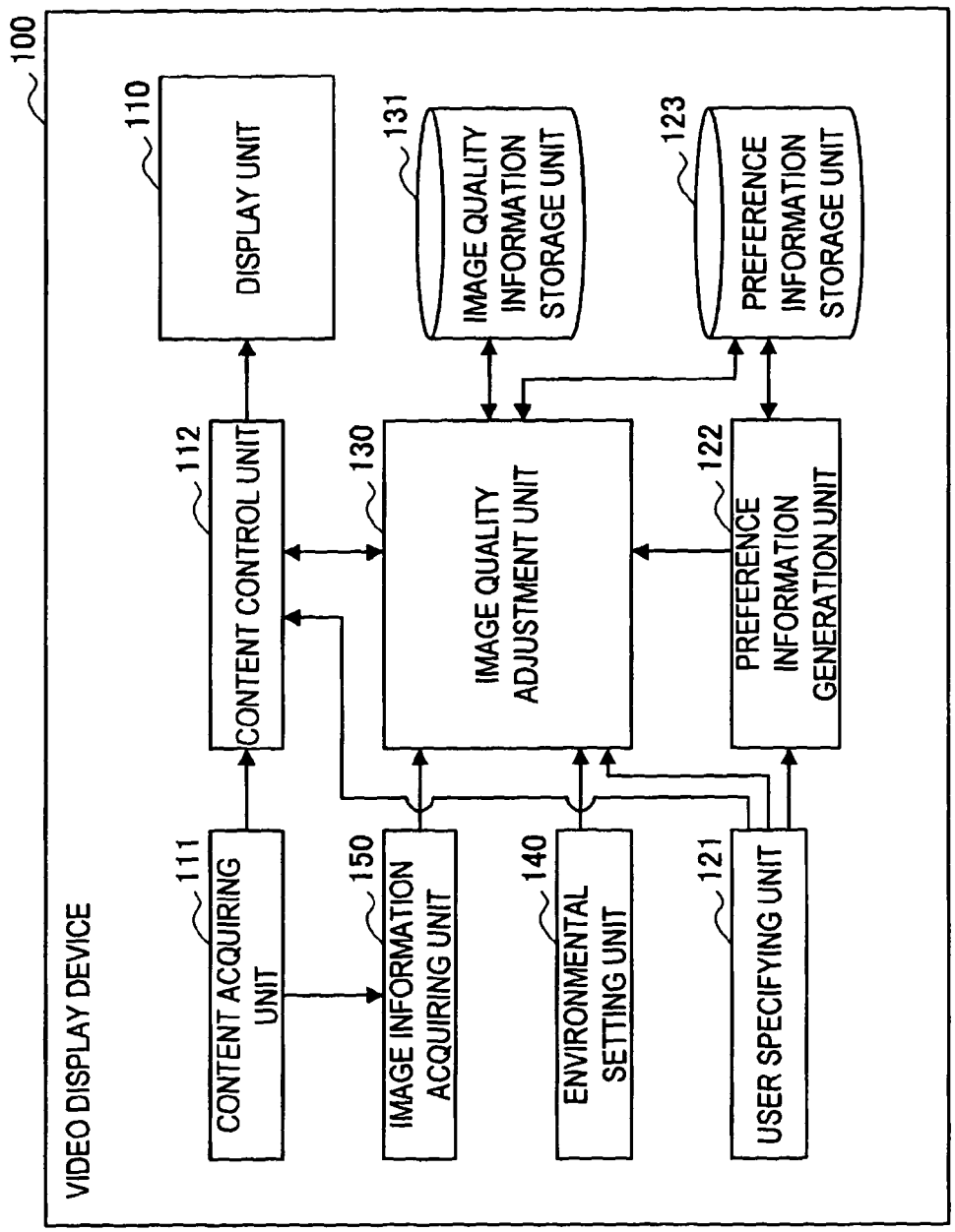
FIG. 2 is an explanatory view for describing a video display device according to the embodiment.

FIG. 2 is an explanatory view for describing the video display device according to one embodiment of the present invention.

As shown in FIG. 2, the video display device 100 includes the display unit 110, a content acquiring unit 111, a content control unit 112, a user specifying unit 121, a preference information generation unit 122, a preference information storage unit 123, an image quality adjustment unit 130, an environmental setting unit 140, and an image quality information acquiring unit 150.

The content acquiring unit 111 acquires the video content broadcasted in the broadcast station 3, the video content input through an external input line, the wired broadcasted video content, and the like and outputs the video content to the content control unit 112. In this case, the content acquiring unit 111 switches the channel (e.g., frequency band etc.), the external input line, or the like for acquiring the video content according to the operation of the user, and acquires the video content to input from the switched destination. An example of a more specific content acquiring unit 111 will be described below. That is, the content acquiring unit 111 includes a tuner, analog-digital converter, a demultiplexer, a decoder (demodulation portion), and the like. The content acquiring unit 111 tunes the tuner to the frequency band of the channel selected according to the operation of the user, and acquires the broadcast signal in the relevant frequency band from the antenna 2. The content acquiring unit 111 also converts the acquired broadcast signal to a digital signal in the analog-digital converter. The digital signal is separated to the moving image or the still image data, audio data, attribute information and the like by the demultiplexer, and output to the content control unit 112.

The content control unit 112 displays the video content acquired from the content acquiring unit 111 on the display unit (display screen) 110. As a result, the video display device 100 can display the video content on the display screen.

The user specifying unit 121 specifies the user viewing the video content displayed on the display unit 110 by the content control unit 112. The user can be specified through various methods.

For instance, the user specifying unit 121 may specify the user according to the operation signal output from the remote controller 4 etc. according to the operation of the user. The user operating the remote controller 4 etc. has a high possibility of viewing the display unit 110. Thus, the user specifying unit 121 can reliably specify the user viewing the video content based on the operation signal of the user.

Figure 3:
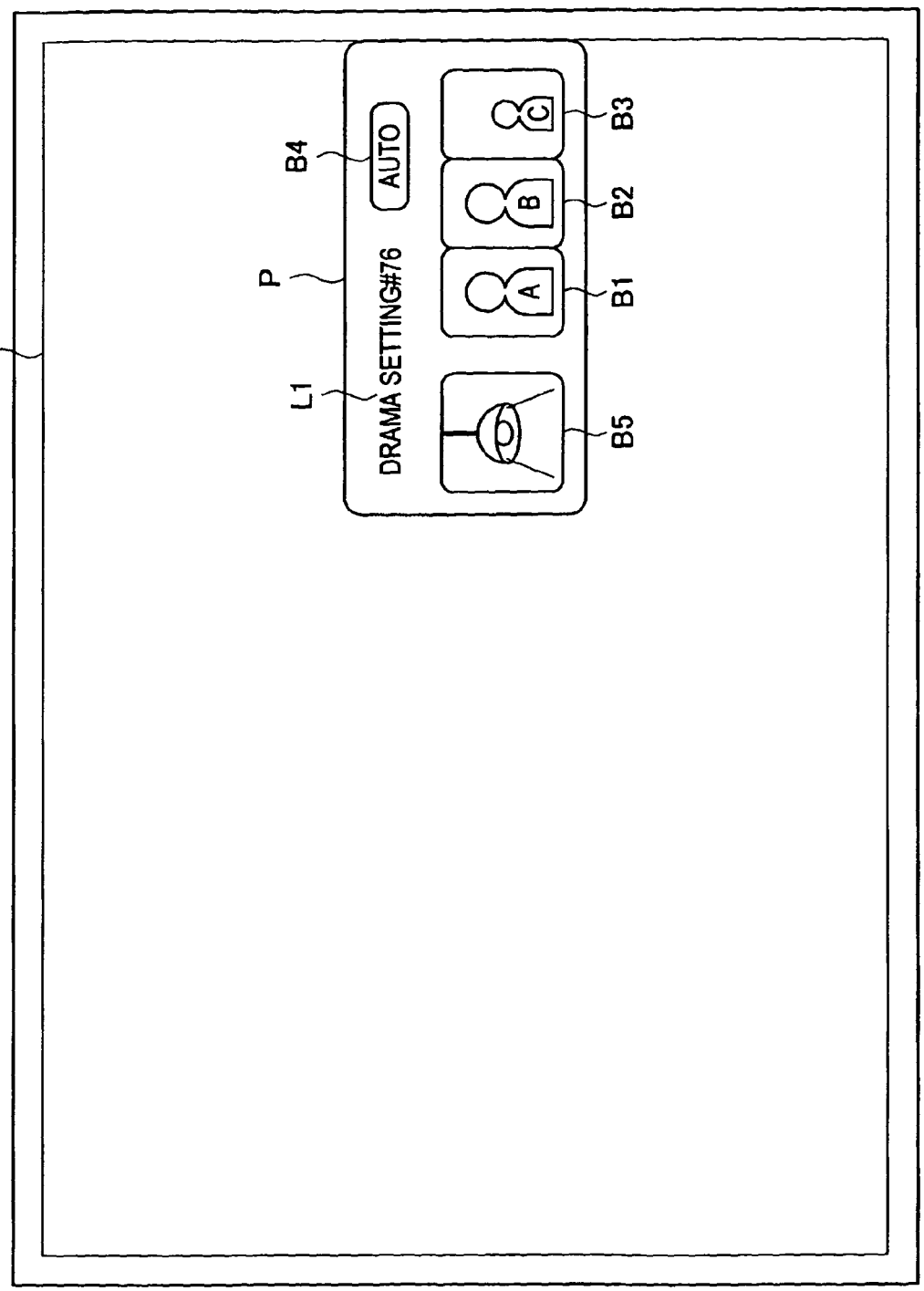
FIG. 3 is an explanatory view for describing an example of an image displayed on a display screen by the video display device according to the embodiment.
Figure 4:
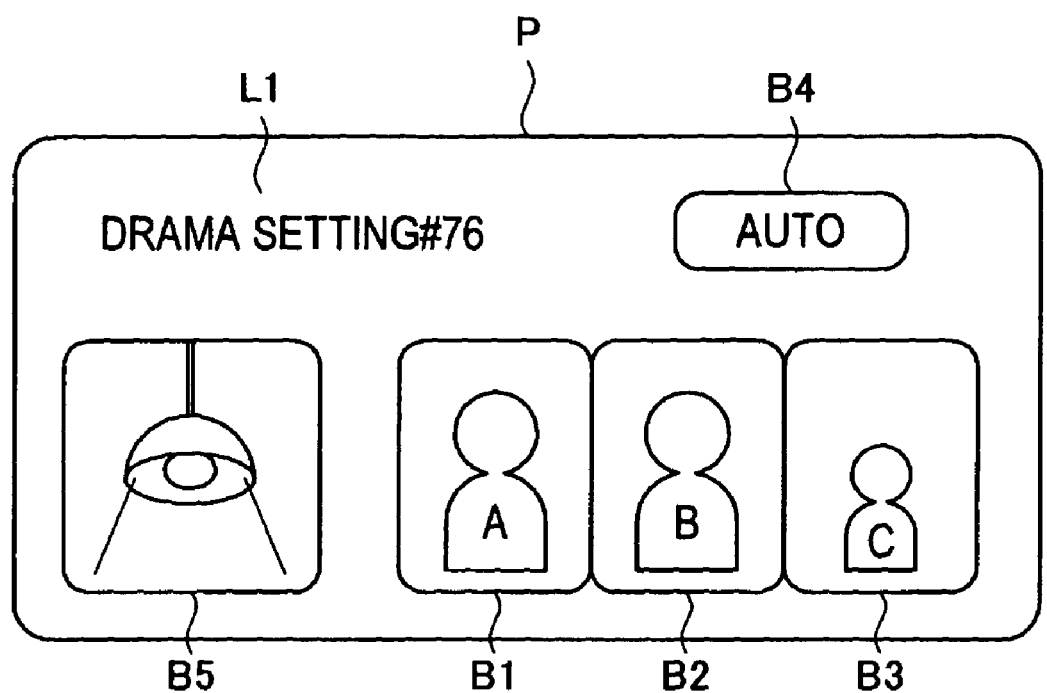
FIG. 4 is an explanatory view for describing an example of an image displayed on a display screen by the video display device according to the embodiment.

In this case, the user specifying unit 121 displays the setting panel P on the display unit 110 displaying the video content by the content control unit 112. An example of the setting panel P is shown in FIG. 4. FIGS. 3 and 4 are explanatory views for describing an example of an image displayed on the display screen by the video display device according to the present embodiment.

As shown in FIGS. 3 and 4, the setting panel P displayed by the user specifying unit 121 differs from the setting panel for manually adjusting each parameter, and includes a plurality of simples buttons B1 to B4, 135 so that operation can be easily performed. The plurality of buttons B1 to B4 are selected according to the operation signal output by the remote controller 4 etc. according to the operation of the user. Furthermore, the user specifying unit 121 displays the currently set image quality information L1 on the setting panel P. The image quality information L displayed on the display unit 110 is desirably name, ID such as number etc., attached to the image quality information.

Each button B1 to B3 is a button for selecting the user viewing the video content. For instance, the user specifying unit 121 is recorded with "user information" of one or more users who are registered by the operation of the user and who may view the video display device 100. The user information is personal information representing the attribute of the user. The user information includes, for example, age, sex, position, relationship (e.g., father, mother, child, president, manager etc.) of the user, name or nickname of the user, birthday of the user, and the like for each user. The user specifying unit 121 assigns one user information to each button B1 to B3 selected according to the operation of the user. Furthermore, the user specifying unit 121 outputs the user information assigned to the selected button B1 to B3 when one or more buttons B1 to B3 are selected according to the operation of the user. That is, the user specifying unit 121 specifies the user represented by the user information as the user actually viewing the video content by outputting the user information. In this case, the user specifying unit 121 may specify a plurality of users and not only one user.

In displaying the setting panel P, the user specifying unit 121 can display images and characters for identifying each user on each button B1 to B3. Examples of such images and characters include name or nickname (e.g., A, B, C) of each user, image showing the face of the user, portrait and icon representing the user, and the like. The user can easily identify which button corresponds to whom by displaying the identification information of the user on each button B1 to B3.

A case in which the user specifying unit 121 specifies the user based on the operation signal of the user has been described, but the user specifying unit 121 can automatically specify the user through another method. In this case as well, the user specifying unit 121 is recorded with the user information. The user specifying unit 121 may include a sensor for detecting the user, specify the user according to the detection result of the sensor, and output the user information. The sensor may be an infrared sensor for specifying the user by the detection result, an imaging device capable of specifying the user by performing an image analyzing process, a sensor for specifying the user by the electric wave from a device such as a portable telephone of the individual user, a sensor capable of specifying the user from features of voice, fingerprint, retina, etc. In this case, the user information registered in the user specifying unit 121 desirably includes information necessary for user specification in each sensor.

The preference information generation unit 122 generates preference information with respect to the image quality of the user specified by the user specifying unit 121. The "preference information" is the information representing the image quality preferred by the user or the tendency thereof. The preference information may be one example of image quality information defined with the parameter for setting the image quality, or may be adjustment information for adjusting the image quality information. That is, the image quality adjustment unit 130, to be hereinafter described, sets each parameter to the preference information if the preference information is one example of the image quality information, and adjusts each set parameter by the preference information if the preference information is the adjustment information. The preference information will be more specifically described. Each user often has different preference on what image quality of what value is preferred with respect to each parameter for determining the image quality. For example, one user may prefer a bright image, whereas another user may prefer a dark image. One user may prefer an image in which redness is strong, whereas another user may prefer an image in which blueness is strong. The image quality information or the adjustment information reflecting the tendency of preference with respect to the image quality of each user is the preference information.

The preference information generation process by the preference information generation unit 122 will be described.

The preference information generation unit 122 starts the operation when the operation signal from the remote controller 4 is selecting the preference information generation after the user specifying unit 121 specifies one user. The preference information generation unit 122 outputs the a plurality of image quality information different from each other to the image quality adjustment unit 130, to be hereinafter described, for adjusting the image quality displayed by the content control unit 112. The preference information generation unit 122 then operates the image quality adjustment unit 130 and the content control unit 112 to display, on the display unit 110, a plurality of videos adjusted to the image quality different from each other by the plurality of image quality information. The preference information generation unit 122 selects at least one of the plurality of videos by a further operation signal output from the remote controller 4 etc., and generates the preference information from the selection result.

Figure 5:
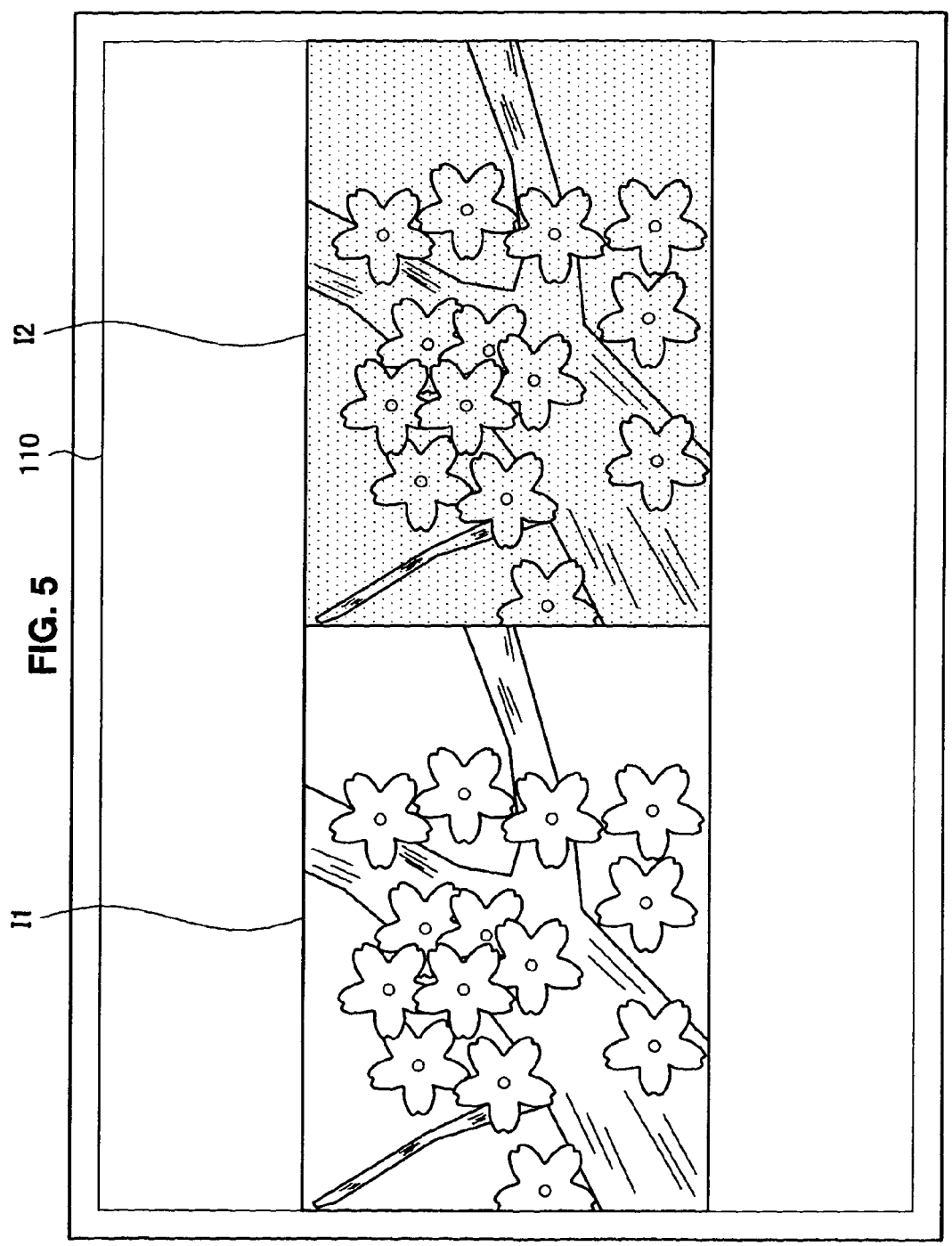
FIG. 5 is an explanatory view for describing an example of an image displayed on a display screen by the video display device according to the embodiment.

The display example is shown in FIG. 5. In FIG. 5, a case in which the content control unit 112 displays two videos I1, I2 having different luminance on the display unit 110 is shown. The user can easily compare the image quality of both videos and select the image quality that agrees with the preference of the user by simultaneously displaying a plurality of videos having different image quality. If the image quality of the entire screen can be changed by changing the setting as in manual parameter adjustment, the user stores the image quality of before the adjustment. Therefore, if the storing is obscure, the user returns the adjustment and then makes the adjustment repeatedly to know how the image quality changed. However, according to the preference information generation unit 122 of the present embodiment, the user can easily compare and review the image qualities without repeating such operation since the plurality of videos having different image qualities are simultaneously displayed on the display unit 110. In FIG. 5, a case where two videos of different image qualities are displayed is illustrated, but the number of videos to simultaneously display may be any number as long as it is in plurals. However, the number of videos to simultaneously display is desirably in plurals and in small number to simplify the operation.

The preference information generation unit 122 once sets the image quality information (e.g., default value, one image quality information, etc.) that becomes a standard, and changes a predetermined parameter from the image quality information that becomes the reference to generate a plurality of videos (samples) having different image qualities. The combination can be simplified by generating a sample video in such manner compared to a case of individually adjusting a plurality of parameters. The preference information generation unit 122 can also prepare the sample video according to the environmental information set by the environmental setting unit 140 described below and the model characteristics (e.g., image size, color, settable parameter, function, etc.) of the video display device 100. For instance, if the environment in which the video display device 100 is installed or the model characteristics of the video display device 100 differ, the operation condition of the preference information generation unit 122 is poor and the appropriate preference information may not be extracted. For instance, if the room is extremely bright, the screen is dirty, or the backlight is weak, the preference of the user is not sufficiently reflected on the preference information. The preference information generation unit 122 can prepare the sample video in view of such case.

The preference information generation unit 122 selects which video of the two image qualities the user prefers by the operation signal output from the remote controller 4 etc., and extracts the characteristics of the image quality preferred by the user. In this case, the preference information generation unit 122 may display a plurality of videos of different image qualities, select one video, and use the image quality information of the relevant video as the preference information of the user, or may select two or more videos, and generate the preference information by combining the image quality information of the relevant videos. The operability of the user can be enhanced when simply generating the preference information compared to the adjustment (method of adjusting the image quality of the video of the entire screen by selecting the image quality information) by another video display device having a plurality of already set image quality information. However, the preference information generation unit 122 according to the present embodiment can further perform the following operations to more finely reflect the preference of the user.

That is, the preference information generation unit 122 performs the operation (hereinafter referred to as "selecting operation") of "displaying the video of a plurality of image qualities as shown in FIG. 5 on the display unit 110, and selecting the video of the image quality preferred by the user according to the operation of the user" over plural times while appropriately changing the image quality. For instance, it two videos are simultaneously displayed, the preference information generation unit 122 displays the videos of two image qualities different from each other, and selects either one based on the operation signal. The preference information generation unit 122 then displays other videos of two image qualities different from each other, and selects either one based on the operation signal. The tendency of the preference of the user with respect to each parameter is extracted by repeating such selecting operation. For instance, if the selecting operation is merely performed once, it is difficult to determine the characteristics of which parameter is reflecting the preference of the user. That is, when the redness is strong and the luminance is high in the image quality of one video, and the redness is weak and the luminance is low in the image quality of another video, assume the user selects the former one. Whether the user prefers the image quality in which the redness is strong, prefers the image quality in which the luminance is high, or prefers both is difficult to distinguish from the image quality of one video. The preference information generation unit 122 can extract the preference information by repeating the selecting operation over plural times by the image quality in which each parameter is appropriately adjusted.

The preference information generation unit 122 may set in advance the number of times to repeat the selecting operation. However, the preference information generation unit 122 may determine whether or not the preference information can be generated while repeating, terminate the repetition of the selecting operation when determining that the preference information can be generated, and generate the preference information based on the selection result up to this point. That is, if the image quality in which the redness is strong is selected in most selections, and the selection that does not depend on other parameters is made, it can be recognized that the user regards only the redness as important. The preference information generation unit 122 may terminate the selecting operation, and generate the preference information in which only the redness is set strong.

The preference information generation unit 122 associates the preference information generated in the above manner with the user information of each user, and records the same in the preference information storage unit 123.

The preference information generation unit 122 acquires the history of the image quality adjustment of each user, and uses the same in generating the preference information. In this case, the history of the image quality adjustment of the individual user is registered in the image quality information storage unit 131 or the server 200, and the preference information generation unit 122 acquires such image quality adjustment history according to the user specified by the user specifying unit 121. The preference information storage unit 123 can extract the preference information from such history, or determine the image quality of the sample image when performing the selecting operation based on the history.

The image quality adjustment unit 130 adjusts the image quality of the video displayed on the display unit 110 by the content control unit 112 according to the user specified by the user specifying unit 121. In this case, the image quality adjustment unit 130 can perform the image quality adjustment based on at least the preference information. That is, the user information of the specified user is output from the user specifying unit 121. Thus, the image quality adjustment unit 130 acquires the preference information associated with the user information from the preference information storage unit 123. The image quality adjustment unit 130 adjusts or sets the image quality using the preference information. That is, the video display device 100 can specify the user with the specifying unit 121, and set the image quality corresponding to the user with the image quality adjustment unit 130.

In this case, the image quality adjustment unit 130 sets each parameter to the preference information if the preference information is the image quality information, and adjusts the already set parameter based on the preference information if the preference information is the adjustment information. A case in which the preference information is mainly the adjustment information will be described below for the sake of convenience of the explanation.

In this case, the image quality information storage unit 131 is recorded with the image quality information that becomes a reference, and the image quality adjustment unit 130 acquires the image quality information and performs adjustment based on the preference information, and sets each parameter to the image quality information of after the adjustment. The image quality adjustment unit 130 may be recorded with a plurality of image quality information, in which case, the image quality adjustment unit 130 can select and acquire one image quality information.

In this case, the image quality adjustment unit 130 may select the image quality information based on the operation signal output from the remote controller 4 etc. The image quality adjustment unit 130 may select the image quality information suited to the video content according to the attribute information of the video content displayed on the display unit 110 by the content control unit 112. In this case, the image quality information storage unit 131 is recorded with each image quality information in association with the attribute information (e.g., genre) of the video content, and the image quality adjustment unit 130 may search and acquire the image quality information with the attribute information of the video content to display as the keyword. For instance, an optimum image quality often differs depending on the attribute information such as whether the video content is drama, sports, animation, or the like. The well-modulated image quality in which the sport movement is heavy is preferred in the case of sport video, and the delicate image quality is preferred in the case of movies. The image quality adjustment unit 130 can adjust the image quality according to the video content by selecting the image quality information according to the attribute information of the video content.

The image quality adjustment unit 130 can automatically perform image quality adjustment if the button B4 is selected with the setting panel P shown in FIGS. 3 and 4 displayed on the display unit 110. In this case, the image quality adjustment unit 130 can select one of the image quality information recorded in the image quality information storage unit 131 irrespective of the user viewing the video content, and perform the setting of each parameter (automatic mode).

When each parameter of the image quality information is manually adjusted in the manual mode, the image quality adjustment unit 130 sets the image quality to the adjustment value. In this case, the image quality adjustment unit 130 may register the manually adjusted image quality information in the image quality information storage unit 131.

The image quality adjustment unit 130 can automatically set the image quality that becomes a reference and adjust the image quality by various other information. Such information includes image quality information acquired from the server 200, the environmental information related to the environment in which the video display device 100 is arranged, and the like. The operation will be described in the environmental setting unit 140 and the image quality information acquiring unit 150 described below.

The image quality adjustment unit 130 desirably checks, according to the operation of the user, whether or not the user desires to adjust the image quality when automatically adjusting the image quality in the image quality adjustment described above or in the image quality adjustment described below.

The environmental setting unit 140 sets the environmental information representing the environment in which the user is viewing the display unit 110. The "environmental information" is the information representing the environment in which the video display device 100 is arranged and the environment or the situation of the surrounding of when the user is viewing the video content. The environmental information may include arranged position of the video display device 100 such as whether the display unit 110 is facing the window, environmental light (e.g., type of light source, color of light, etc.) such as solar light, fluorescent lamp, incandescent lamp, and the like, region (e.g., country) of the arranged position, time at which the user is viewing, and the like.

The setting of the environmental information by the environmental setting unit 140 is performed when the button B5 is selected with the setting panel P shown in FIGS. 3 and 4 displayed on the display unit 110. The environmental setting unit 140 can set the environmental information based on the operation signal output by the remote controller 4, and the like. In addition, the environmental setting unit 140 can automatically set the environmental information. For instance, the environmental setting unit 140 can acquire information such as sunrise time and sunset time, and weather of the day via the network 5 or via the broadcast wave, and specify the type of light source, color of light, and the like from such information.

If such environmental information is changed, the image quality viewed by the user also changes. Thus, the image quality adjustment unit 130 can acquire the environmental information, and perform the image quality adjustment with the environmental information. For instance, if the environmental information indicates "during daytime, and window is close", the image quality adjustment unit 130 can adjust the image quality so as to enhance the luminance of the display video. The environmental setting unit 140 desirably sets the arranged position, the type of illumination and color of light, the region of the arranged position, and the like when the arranged position of the video display device 100 is determined or changed, and automatically sets other environmental information in other cases. Thus, through the setting based on the environmental information set by the environmental setting unit 140, the image quality adjustment unit 130 can perform the image quality adjustment according to the surrounding environment of the video display device 100.

The image quality adjustment unit 130 can perform the adjustment by the environmental information with the adjustment by the preference information of the user, but may perform one of such adjustments.

The image quality information acquiring unit 150 acquires the image information from the server 200 recorded with the image quality information. When using the image quality information acquired by the image quality information acquiring unit 140, the image quality adjustment unit 130 can set the image quality of the video to display on the display unit 110 using such image quality information. The system 1 can share the image quality information or collectively manage the image quality information by performing the image quality adjustment by the image quality information acquired from the server 200.

In this case, the video display device 100 can add various effects to the image quality adjustment by appropriately changing the acquiring method and the acquiring timing of the image quality information from the server 200. The following examples can be considered in describing the acquiring method. The acquiring method and the acquiring timing are not limited to the following examples, and it can be recognized that various variations can be contrived.

For instance, the image quality information acquiring unit 150 may acquire the attribute information of the video content acquired by the content acquiring unit 111, and acquire the image quality information recorded in the server 200 in association with the attribute information. In this case, the image quality information suited for each video content is recorded in advance in the server 200 in association with the attribute information of the relevant video content. The image quality information acquiring unit 150 can acquire the image quality information, and the image quality adjustment unit 130 can perform image quality adjustment using the mage quality information customized for every video content. Therefore, the video display device 100 can provide videos with the image quality suited for every video content. In this case, the acquiring timing of the of the image quality information is desirably set to the time point at which the attribute information of the video content is changed. Finer image quality adjustment responding to various video contents can be performed by using the image quality information stored in the server 200 than when using the image quality information stored in the image quality information storage unit 131 of the video display device 100 in advance.

Figure 6:
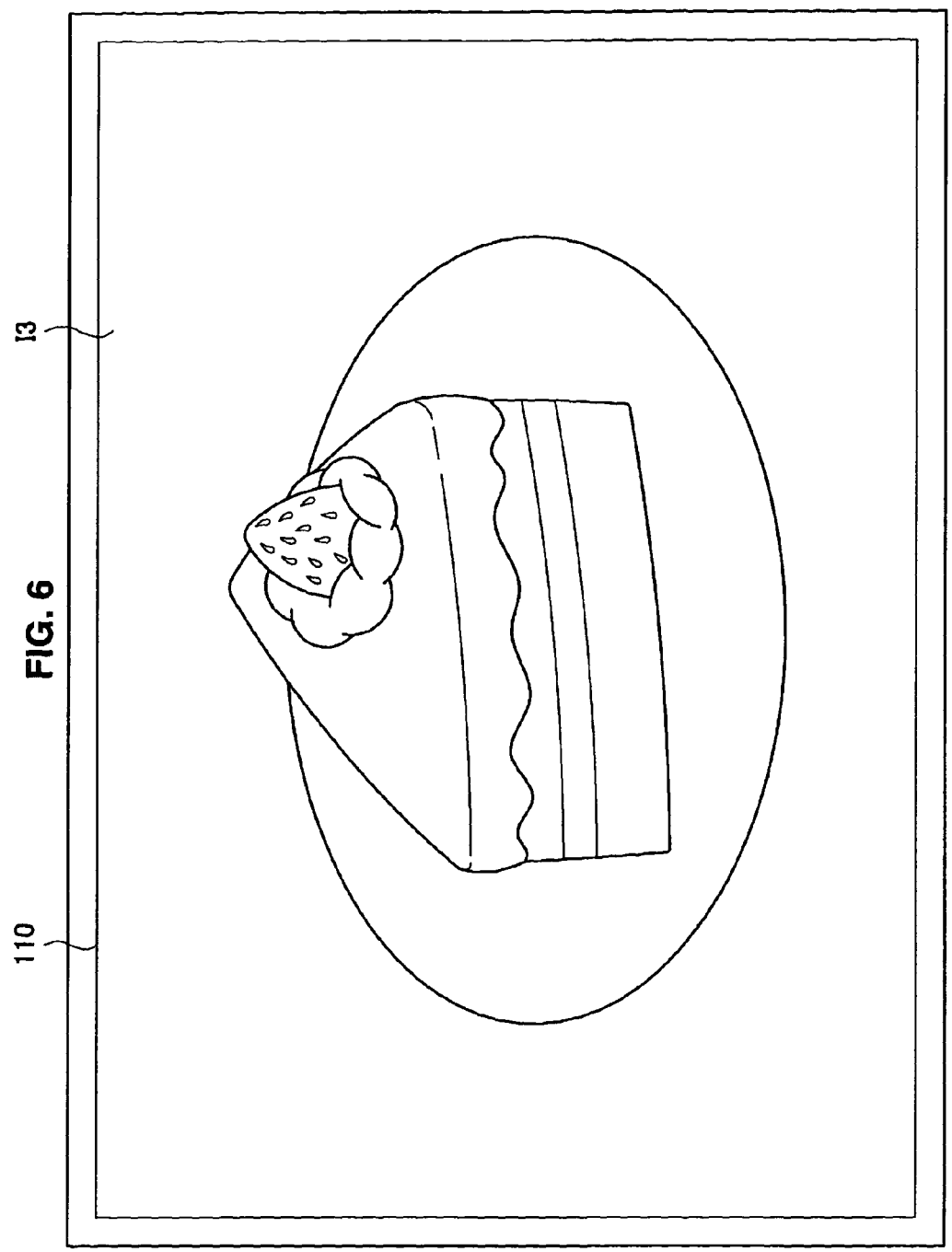
FIG. 6 is an explanatory view for describing a server according to the embodiment.
Figure 7:
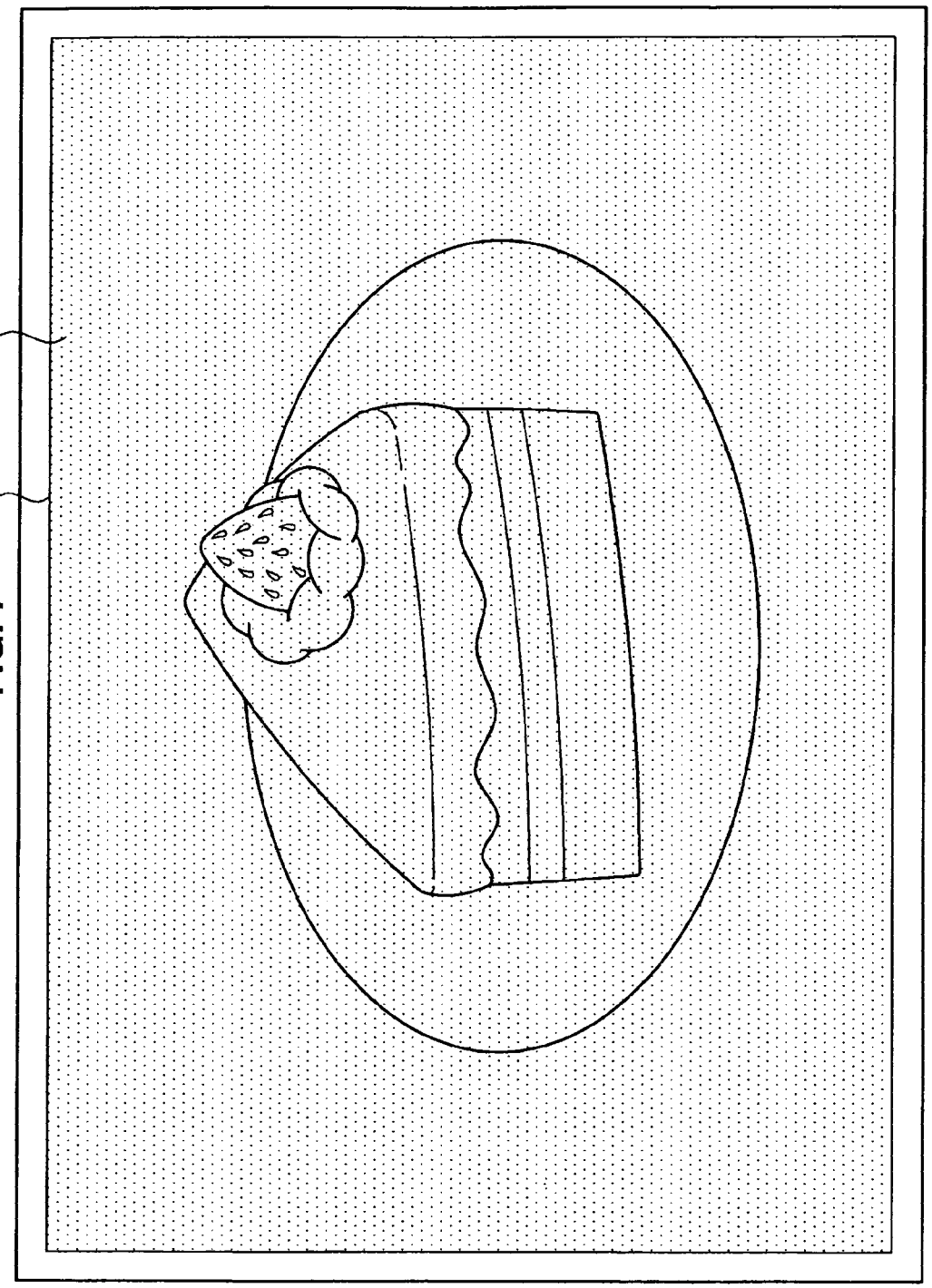
FIG. 7 is an explanatory view for describing one example of an image displayed on the display screen by the video display device according to the embodiment.

The image quality information acquiring unit 150 can acquire the image quality information for the acquiring timing by periodically polling the server 200. In polling, the image quality information acquiring unit 150 accesses the server 200 at a time point a constant time has elapsed, and acquires the image quality information recorded in the server 200. In this case, the image quality information acquiring unit 150 may acquire different image quality information, but may adjust the image quality of the video content while such video content is being displayed by acquiring the same image quality information that are changed. That is, assume a video I3 by one image quality is displayed on the display unit 110, as shown in FIG. 6. When a constant time has elapsed, the image quality of the display video I4 of the display unit 110 is adjusted, as shown in FIG. 7, even if the displayed video content is the same. The image quality information is appropriately updated can add various effects through the changing method of the image quality information. The changing method will be described in association with the server 200.

The image quality information acquiring unit 150 can acquire the image quality information from the server 200 for the acquiring timing when the user uses one video display device 100 for the first time. For instance, the user uses another video display device 6A or the terminal 6B to register the image quality information, which the user has set, and the preference information recorded in the preference information storage unit 123 in the server. The one video display device 100 acquires the identification information of each user to search and acquire the image quality information of the user in the server 200, and uses the same for the image quality adjustment. That is, the one video display device 100 can use the image quality information registered in the server 200 by the server 200 even with respect to the user using the video display device 100 for the first time, and the image quality adjustment suited to such user can be performed. According to such acquiring timing, the user can enjoy the video of the image quality he/she prefers in various situations such as when newly buying or replacing the video display device 100, and furthermore, when using the video display device 100 at the outing destination.

The image quality information (may be preference information) adjusted by each user, intellectuals, industrial experts, technicians, person having great knowledge of the video display device 100, person having great knowledge of the video content, experts of the video, and the like may be recorded in the server 200. The image quality information acquiring unit 150 can acquire the image quality information of the adjusting person selected by the user from such image quality information. For instance, the image quality information can be shared by using the image quality information recorded by each user. In this case, the image quality information acquiring unit 150 acquires a list of image quality information recorded in the server 200 from the server, displays the list on the display screen, and enables the user to list select the desired image quality information. The image quality similar to the image quality adjusted by experts may be provided by using the image quality information recorded by other experts etc. The adjustment history of the image quality setting of each user can be known by recording the image quality information or the preference information of each person in the server 200. Therefore, the tendency of the preference with respect to the image quality of the user can be researched using such history.

The image quality information acquiring process from the server 200 by the image quality information acquiring unit 150 has been described above, but in this case, the image quality information acquiring unit 150 can select by filtering the image quality information acquired from the server 200 using the preference information, and the like. That is, when the image quality information acquiring unit 150 acquires the preference information of each user from the preference information storage unit 123, and acquires the image quality information that disagrees with the preference of the user based on such preference information, such image quality information may not be used for the image quality adjustment. In this case, the video display device 100 can prevent the image quality of the display video from being suddenly adjusted to the image quality not preferred by the user.

(Server 200)

Figure 8:
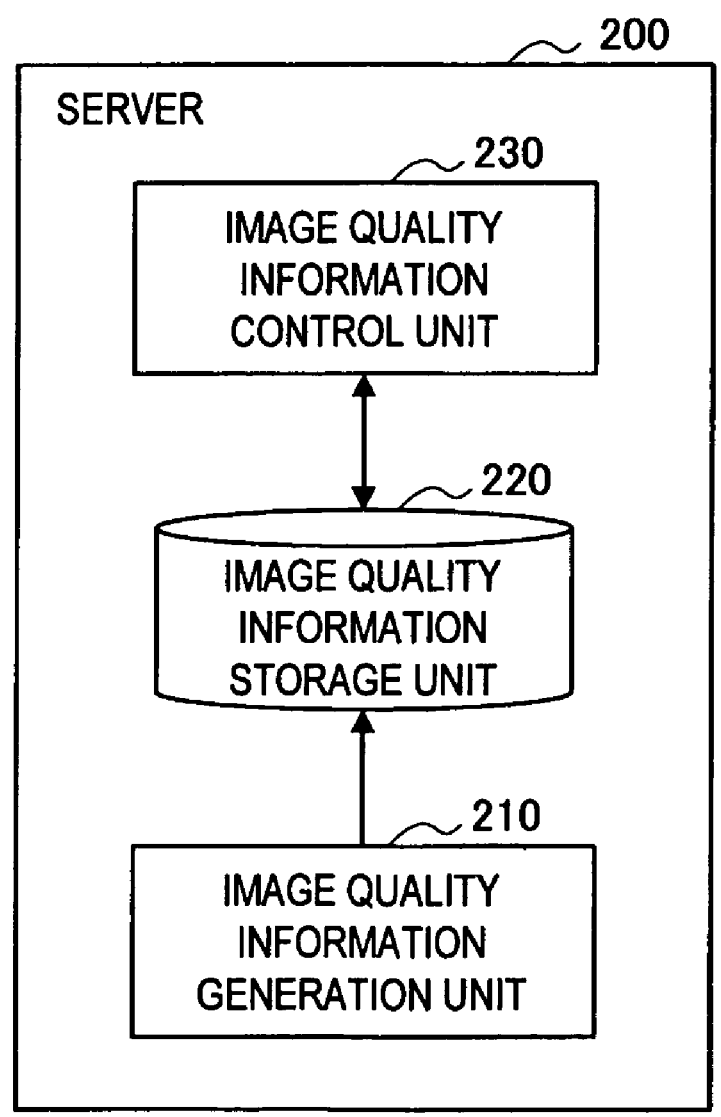
FIG. 8 is an explanatory view for describing one example of an image displayed on the display screen by the video display device according to the embodiment.

FIG. 8 is an explanatory view for describing the server according to one embodiment of the present invention.

As shown in FIG. 8, the server includes an image quality information generation unit 210, an image quality information storage unit 220, and an image quality information control unit 230.

The image quality information generation unit 210 acquires the image quality information from the video display device 100, another video display device 6A, the terminal 6B, and the like, and records the image quality information in the image quality information storage unit 220. In this case, the image quality information generation unit 210 can register the preference information other than the image quality information. Hereinafter, the image quality information is assumed to be contained in the preference information.

The image quality information generation unit 210 acquires the image quality information adjusted by each user or the experts and the information related to the user or the adjusting person, and registers in the image quality information storage unit 220 in association with the image quality information and the user information. The information related to the user used herein may be the information capable of specifying the user such as user information, the ID of the user, the ID of the video display device, the ID of the terminal, and the like.

When acquiring the image quality information adjusted according to the attribute information of the video content, the image quality information generation unit 210 may register the image quality information and the attribute information of the video content in the image quality information storage unit 220 in association to each other. In this case, the genre of the video content, the ID of the video content, and the like can be used for the attribute information associated with the image quality information.

Furthermore, the image quality information generation unit 210 can register each image quality information and the name of such image quality information in association to each other, and can add a unique ID or add the setting of disclosure/non-disclosure to the image quality information. The server 200 allows only the same user to acquire the image quality information in the case of non-disclosure, and allows other users to also acquire the image quality information in the case of disclosure.

The image quality information control unit 230 manages the image quality information recorded in the image quality information storage unit 220. That is, when the image quality information acquiring request is transmitted from the image quality information acquiring unit 150 of the video display device 100, the image quality information control unit 230 provides the image quality information corresponding to such request to the image quality information acquiring unit 150. If the image quality information is non-disclosure or if the request is from an acquisition-disabled user or the video display device 100, the image quality information control unit 230 does not provide the image quality information. The request includes a request specifying the ID of the user, a request specifying the attribute information of the video content, and a request specifying the ID unique to the image quality information. The image quality information control unit 230 acquires the attribute information corresponding to each request from the image quality information storage unit 220, and transmits the attribute information to each requester. In this case, each request may contain the preference information of the user who transmitted the request, and the image quality information control unit 230 can further adjust the image quality information complying with the request based on the preference information, and transmit the same.

The image quality information control unit 230 can change the image quality information recorded in the image quality information storage unit 220. For instance, if a plurality of users is using the image quality information of one user, the image quality information control unit 230 changes the image quality information according to the operation of the relevant one user (may be other user). The image quality information can be updated even with the video display device 100 of a plurality of users. The image quality information changed in real time then can be shared among a plurality of people.

For instance, when the server 200 or another server collects in real time the evaluation of the video content from a plurality of viewers viewing the relevant one video content, the image quality information control unit 230 can adjust the image quality information in conjunction with such evaluation. In this case, the image quality information control unit 230 acquires the evaluation of the video content, adjusts the image quality information associated with the attribute information of the video content, and provides the same to the video display device 100 acquiring the image quality information. Thus, in the video display device 100, when the evaluation of the video content displaying the video I3 at one image quality as shown in FIG. 6 lowers and is no longer popular, the video I4 having the image quality in which the luminance of the display video is lowered as shown in FIG. 7 is displayed. The evaluation may be popularity of the video content, beneficial degree, correct answer rate of the quiz, the viewer rate, and the like. Through such image quality adjustment, a new participating broadcast of participating the user, who had to view the video content that is normally broadcasted, in the evaluation of the video content is not possible.

<Operation of One Embodiment>

Each configuration of the system according to one embodiment of the present invention has been described above.

Figure 9:
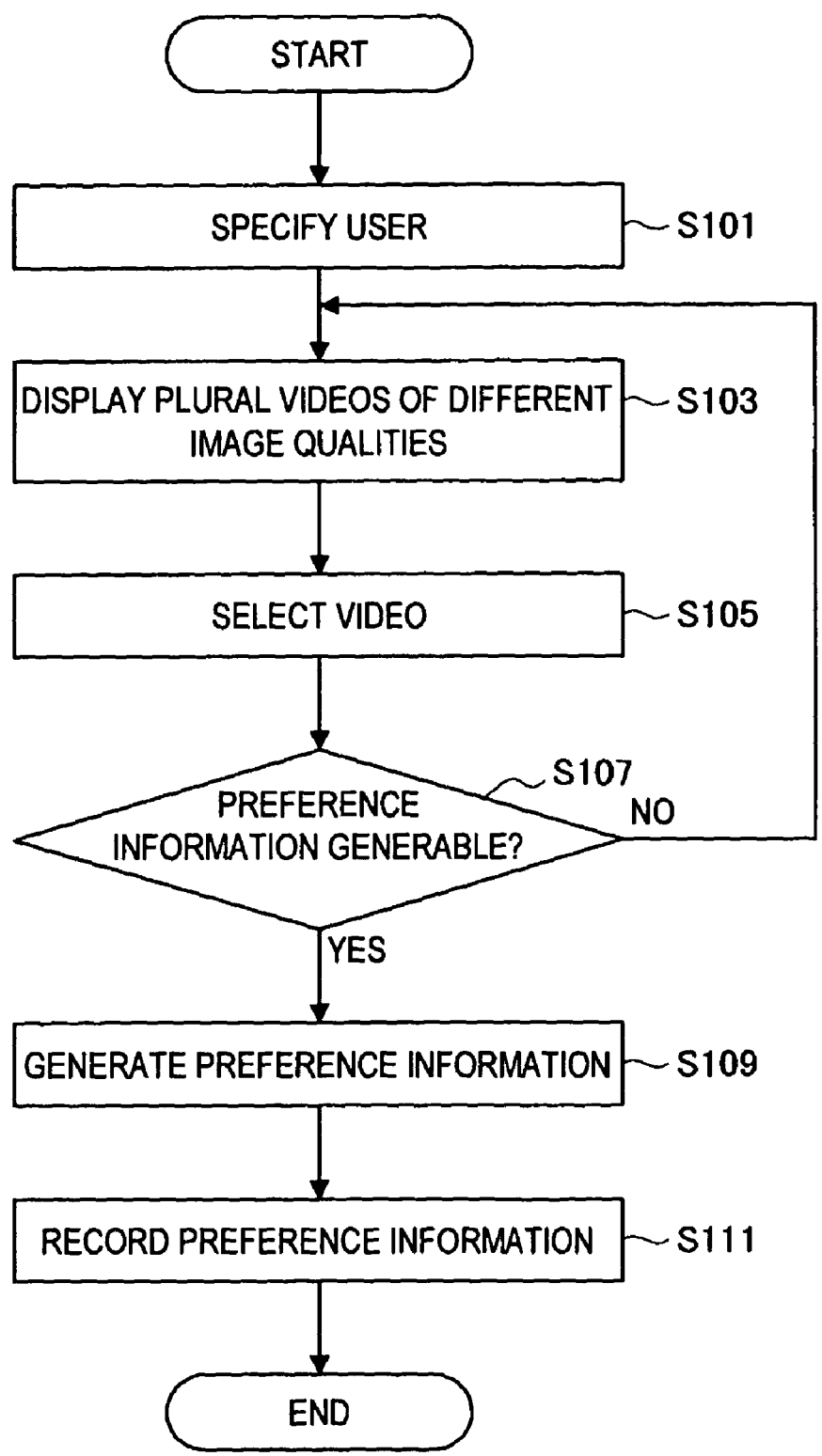
FIG. 9 is an explanatory view for describing the operation of the video display device according to the embodiment.
Figure 10:
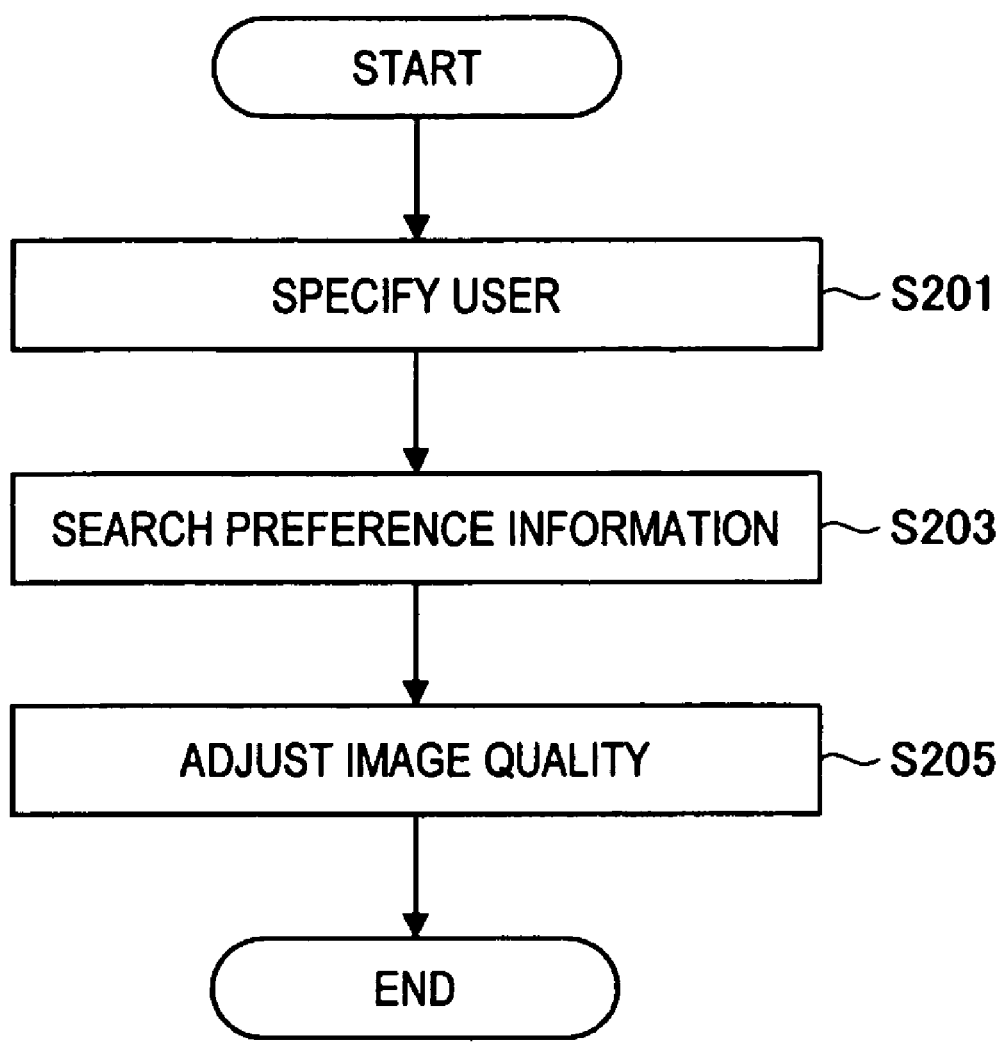
FIG. 10 is an explanatory view for describing the operation of the video display device according to the embodiment.
Figure 11:
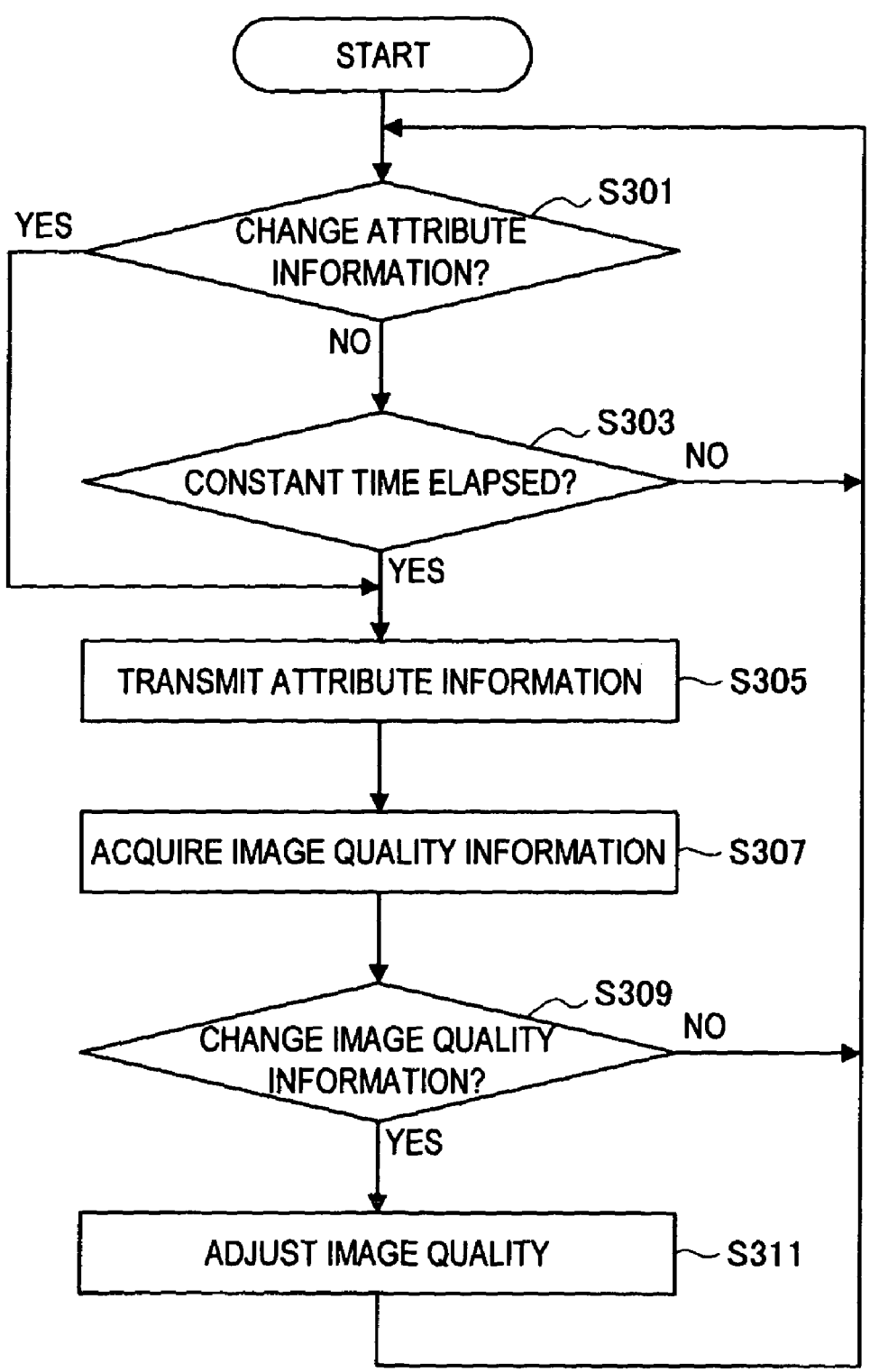
FIG. 11 is an explanatory view for describing the operation of the video display device according to the embodiment.

The operation of the video display device 100 according to one embodiment of the present invention will now be described with reference to FIGS. 9 to 11. FIGS. 9 to 11 are explanatory views for describing the operation of the video display device according to the present embodiment.

(One Example of Preference Information Generation Operation)

First, one example of the preference information generation operation will be described with reference to FIG. 9.

As shown in FIG. 9, step S101 is first processed when the content acquiring unit 111 and the content control unit 112 are displaying the video content on the display unit 110. In step S101, the user viewing the video display device 100 is specified by the user specifying unit 121. The process then proceeds to step S103.

In step S103, the preference information generation unit 112 operates the image quality adjustment unit 130 and the content control unit 112, and displays plural videos (sample image) having different image quality with respect to each other on the display unit 110 (see FIG. 5). The process then proceeds to step S105.

In step S105, the preference information generation unit 122 selects one video according to the operation of the user. The process then proceeds to step S107.

In step S107, the preference information generation unit 122 checks whether or not the selection result by the selecting operation is obtained to an extent the preference information can be generated. If determined that the preference information is still not generated, the processes after step S103 are repeated. If the selection result is obtained to an extent the preference information can be generated, the process proceeds to step S109.

In step S109, the preference information generation unit 122 generates the preference information based on the selection result. The process then proceeds to step S111.

In step S111, the preference information generation unit 122 records the generated preference information in the preference information storage unit 123, and terminates the operation.

(One Example of Image Quality Adjustment Operation)

One example of the image quality adjustment operation will now be described with reference to FIG. 10.

As shown in FIG. 10, step S201 is processed when the content acquiring unit 111 and the content control unit 112 are displaying the video content on the display unit 110 (content display step). In step S201, the user viewing the video display device 100 is specified by the user specifying unit 121 (user specifying step). The process then proceeds to step S203.

In step S203, the image quality adjustment unit 130 searches and acquires the preference information of the specified user from the preference information recorded in the preference information storage unit 123. The process then proceeds to step S205.

In step S205, the image quality adjustment unit 130 adjusts the image quality information used in displaying the video in the content control unit 112 based on the preference information (image quality adjustment step), and terminates the operation.

(One Example of Image Quality Adjustment in Conjunction with Server)

One example of the image quality adjustment in conjunction with the server 200 will be described with reference to FIG. 11.

As shown in FIG. 11, step S301 is processed when the content acquiring unit 111 and the content control unit 112 are displaying the video content on the display unit 110. In step S301, the image quality information acquiring unit 150 checks whether or not the attribute information of the video content displayed on the display unit 110 is changed. The process proceeds to step S305 if changed, and the process proceeds to step S303 if not changed.

In step S303, the image quality information acquiring unit 150 checks whether or not a constant time has elapsed from when the image quality information is acquired the previous time. The process proceeds to step S305 if the constant time has elapsed, and the processes after step S301 are repeated if the constant time has not elapsed.

In step S305, the image quality information acquiring unit 150 transmits the attribute information of the video content (e.g., ID and genre of the video content) to the server 200. The process then proceeds to step S307.

In step S307, the image quality information acquiring unit 150 acquires the image quality information searched and transmitted by the server 200, and outputs the same to the image quality adjustment unit 130. The process proceeds to step S309 after the process of step S307.

In step S309, whether or not the image quality information is changed is checked by the image quality adjustment unit 130. The processes after step S301 are repeated if the image quality information is not changed, and the process proceeds to step S311 if the image quality information is changed.

In step S311, the image quality adjustment unit 130 changes the image quality information used in displaying the video in the content control unit 112 to the image quality information acquired in step S307, adjusts the image quality, and terminates the operation.

<Example of Effects by One Embodiment>

The system 1, the video display device 100, and the like according to one embodiment of the present invention have been described above.

According to the video display device 100, the image quality can be adjusted for every user. Therefore, the image quality reflecting the preference of the individual user can be realized.

Furthermore, the video display device 100 can extract the preference with respect to image quality of each user, and automatically adjust the image quality according to the extracted preference. Therefore, the user can customize the image quality with a simple operation. In this case, the video display device 100 displays a plurality of videos having different image qualities altogether. Therefore, the user can easily determine which image quality agrees with his/her preference, and can perform image quality adjustment reliably reflecting the preference of the user.

The video display device 100 can dynamically adjust the image quality according to the arranged environment or the environment the user is viewing the video. Thus, the video display device 100 enables fine image quality adjustment corresponding to the environment and can further enhance the image quality.

The video display device 100 also enables the image quality adjustment for every video content, and can acquire the image quality information from the server 200. Therefore, the image quality can be enhanced and the image quality information can be shared. Sharing the image quality information enables development in the CGM (Consumer Generated Media) among a plurality of users, facilitates the research on the tendency of preference with respect to image quality of the user, and uses the same as data in time of product development/improvement. The image quality may be adjusted in combination with the event associated with the video content, and the like to enable utilization in various business scenes such as increasing the luminance of the commercial to emphasize etc.

It should be understood by those skilled in the art that various modifications, combinations, sub-combinations and alterations may occur depending on design requirements and other factors insofar as they are within the scope of the appended claims or the equivalents thereof.

In the above-described embodiment, a case in which the image quality information acquiring unit 150 acquires the image quality information from the server 200 has been described. However, the acquiring destination of the image quality information of the image quality information acquiring unit 150 is not limited to such example. For instance, the image quality information may be contained in the attribute information of the video content, and the image quality information acquiring unit 150 may acquire the image quality information from the video content.

A series of processes described in each embodiment may be executed by a dedicated hardware but may be executed by software (application) such as AppliCast and widget. When performing the series of processes by software, the series of processes can be realized by having a general-purpose or a dedicated computer execute the program. The computer may include a CPU (Central Processing Unit), a recording device such as HDD (Hard Disk Drive), ROM (Read Only Memory), and RAM (Random Access Memory), a communication device connected to a network such as LAN (Local Area Network) and Internet, an input device such as remote controller, mouse, and keyboard, a drive for reading and writing a removable recording medium such as a magnetic disc including a flexible disc, an optical disc including various types of CD (Compact Disc), MO (Magneto Optical) disc, and DVD (Digital Versatile Disc), and a semiconductor memory, and an output device such as a display unit including a monitor and an audio output device including a speaker and a headphone. The series of processes may be executed by having the computer execute the program recorded in the recording device or the removable recording medium, or the program acquired through the network.

In the specification, the steps described in the flowchart obviously include processes performed in time-series along the described order, but also processes not executed in time-series but executed in parallel or individually. It can be recognized that the order can be appropriately changed, in some cases, even for the steps processed in time-series.

What is claimed is:

1. A video display device comprising:
   a content control unit for displaying a video content on a display screen;
   a user specifying unit for specifying a user viewing the video content displayed on the display screen;
   a preference information generation unit being configured to perform a selecting operation a plurality of times so as to generate preference information in which in each said selecting operation a plurality of sample videos is displayed on the display screen to the specified user, where each sample video is displayed on the display screen having at least one different image quality characteristic than another sample video displayed on the display screen;
   the preference information generation unit receiving an operation from the specified user indicating which of the plurality of sample videos displayed on the display screen is most preferred by the specified user for each said selecting operation,
   the preference information generation unit being further configured to determine whether the preference information can be generated based on a result or results of the selecting operation or operations which have been performed up to a present time and when a determination result thereof indicates that the preference information can be generated, to terminate a remaining one or ones of the selecting operations, and to generate the preference information based on the result or results of the selecting operation or operations which have been performed up to the present time; and
   an image quality adjustment unit for adjusting, based on the preference information generated by the preference information generation unit, an image quality for the video content displayed on the display screen to the specified user.

2. A video display device comprising:
   a content control unit for displaying a video content on a display screen;
   a user specifying unit for specifying a user viewing the video content displayed on the display screen;
   a preference information generation unit being configured to display a plurality of sample videos on the display screen to the specified user, where each sample video is displayed on the display screen having at least one different image quality characteristic than another sample video displayed on the display screen, each of the at least one different image quality characteristic of each sample video being generated automatically by the preference information generation unit;
   the preference information generation unit receiving an operation from the specified user indicating which of the plurality of sample videos displayed on the display screen is most preferred by the specified user, the preference information generation unit being further configured to extract the at least one automatically-generated different image quality characteristic for the sample video most preferred by the specified user;
   an image quality adjustment unit for adjusting, based on the at least one automatically-generated different image quality characteristic extracted for the sample video most preferred by the specified user, an image quality for the video content displayed on the display screen to the specified user; and
   an environmental setting unit for setting environmental information representing an environment in which the user is viewing the display screen,
   in which the image quality adjustment unit automatically adjusts the image quality for the video content displayed on the display screen based further on the environmental information set by the environmental setting unit.

3. A video display device comprising:
   a content control unit for displaying a video content on a display screen;
   a user specifying unit for specifying a user viewing the video content displayed on the display screen;
   a preference information generation unit being configured to display a plurality of sample videos on the display screen to the specified user, where each sample video is displayed on the display screen having at least one different image quality characteristic than another sample video displayed on the display screen, each of the at least one different image quality characteristic of each sample video being generated automatically by the preference information generation unit;
   the preference information generation unit receiving an operation from the specified user indicating which of the plurality of sample videos displayed on the display screen is most preferred by the specified user, the preference information generation unit being further configured to extract the at least one automatically-generated different image quality characteristic for the sample video most preferred by the specified user;

an image quality adjustment unit for adjusting, based on the at least one automatically-generated different image quality characteristic extracted for the sample video most preferred by the specified user, an image quality for the video content displayed on the display screen to the specified user; and a content acquiring unit for acquiring the video content and attribute information representing an attribute of the video content, in which the attribute is a genre of the video content, and in which the image quality adjustment unit adjusts the image quality for the video content displayed on the display screen based further on the attribute information acquired by the content acquiring unit.

4. The video display device according to claim 3, further comprising:

the content acquiring unit for acquiring the video content and the attribute information representing the attribute of the video content; and an image quality information acquiring unit for acquiring image quality information from a server recorded with the image quality information representing a setting state of the image quality for the video content displayed on the display screen and being associated with the attribute information of the video content, wherein the image quality adjustment unit adjusts the image quality for the video content displayed on the display screen based on the image quality information associated with the attribute information acquired by the content acquiring unit.

5. The video display device according to claim 4, wherein the image quality information acquiring unit acquires from the server the image quality information changed according to an evaluation of a viewer of the video content in the server.

6. A video display method comprising the steps of:

identifying a particular user viewing a video content displayed on the display screen;

displaying a plurality of sample videos on the display screen to the particular user, where each sample video is displayed on the display screen having at least one different image quality characteristic than another sample video displayed on the display screen, each of the at least one different image quality characteristic of each sample video being generated automatically;

receiving an operation from the particular user indicating which of the plurality of sample videos displayed on the display screen is most preferred by the specified user;

extracting the at least one automatically-generated different image quality characteristic for the sample video most preferred by the specified user;

adjusting, based on the at least one automatically-generated different image quality characteristic extracted for the sample video most preferred by the specified user, an image quality for the video content displayed on the display screen to the specified user; and further comprising the step of setting environmental information representing an environment in which the user is viewing the display screen, in which the adjusting step automatically adjusts the image quality for the video content displayed on the display screen based further on the environmental information set by the setting step.

* * * * *